United States Patent
Ono et al.

(10) Patent No.: US 10,926,448 B2
(45) Date of Patent: Feb. 23, 2021

(54) METHOD FOR PRODUCING RESIN MOLDED BODY AND PRESS MOLDING APPARATUS

(71) Applicants: FUJI JUKOGYO KABUSHIKI KAISHA, Tokyo (JP); TOA INDUSTRIES Co., Ltd, Ota (JP)

(72) Inventors: Tsubasa Ono, Tokyo (JP); Satoshi Yoshizawa, Tokyo (JP); Tadashi Iwanuma, Ota (JP)

(73) Assignee: SUBARU CORPORATION, Tokyo (JP)

(*) Notice: Subject to any disclaimer, the term of this patent is extended or adjusted under 35 U.S.C. 154(b) by 676 days.

(21) Appl. No.: 15/164,517

(22) Filed: May 25, 2016

(65) Prior Publication Data

US 2016/0354967 A1    Dec. 8, 2016

(30) Foreign Application Priority Data

Jun. 4, 2015 (JP) .............................. JP2015-113978

(51) Int. Cl.
*B29C 51/08* (2006.01)
*B29C 70/46* (2006.01)
(Continued)

(52) U.S. Cl.
CPC ............ *B29C 51/082* (2013.01); *B29C 70/46* (2013.01); *B29C 70/541* (2013.01);
(Continued)

(58) Field of Classification Search
CPC .......... B29C 70/02; B29C 51/20; B29C 33/04
See application file for complete search history.

(56) References Cited

U.S. PATENT DOCUMENTS 2,169,798 A * 8/1939 Haberstump ........... B44B 5/026
  101/28
2,510,024 A * 5/1950 Mayer ..................... B21D 13/02
  72/397
(Continued)

FOREIGN PATENT DOCUMENTS

JP    61-037916 U    3/1986
JP    02-206515 A    8/1990
(Continued)

OTHER PUBLICATIONS

Mallon et al., Issues in Diaphragm Forming of Continuous Fiber Reinforced Thermoplastic Composites, Aug. 1991, Polymer Composites, vol. 12, No. 4, pp. 246-256 (Year: 1991).*
(Continued)

*Primary Examiner* — Matthew J Daniels
*Assistant Examiner* — Andrew D Graham
(74) *Attorney, Agent, or Firm* — Chip Law Group

(57) ABSTRACT

A method for producing a three-dimensional fiber-reinforced resin molded body by press-molding a heated and softened plate-like molding matrix using a mold, the method sequentially including: setting the matrix on a lower mold including a pad and mold main bodies by mounting a central portion of the matrix on the pad and supporting at least one end side of the matrix by at least one support protruding upward from a molding surface of at least one of the mold main bodies; bringing an upper mold and the lower mold close together to sandwich the central portion of the matrix by the pad and the upper mold; bringing the upper and lower molds still closer together to reduce the protrusion amount of the at least one support; and pressing the matrix by using the lower and upper molds to form the molded body.

8 Claims, 8 Drawing Sheets

(51) Int. Cl.
*B29C 70/54* (2006.01)
*B29K 105/06* (2006.01)

(52) U.S. Cl.
CPC .......... *B29C 51/085* (2013.01); *B29C 51/087* (2013.01); *B29K 2105/06* (2013.01)

(56) References Cited

U.S. PATENT DOCUMENTS

| | | | | |
|---|---|---|---|---|
| 2,874,751 A * | 2/1959 | Norton | B29C 33/02 | 100/319 |
| 3,453,950 A * | 7/1969 | Pfeiffer | B29C 33/04 | 100/199 |
| 3,596,869 A * | 8/1971 | Humphrey | B28B 7/025 | 249/155 |
| 3,748,889 A * | 7/1973 | Miller | B21D 13/02 | 72/382 |
| 4,105,184 A * | 8/1978 | Sumitomo | B29C 33/04 | 249/111 |
| 4,432,716 A * | 2/1984 | Kiss | B27N 5/00 | 264/109 |
| 4,489,031 A * | 12/1984 | Ogihara | B29C 37/006 | 264/294 |
| 4,555,086 A * | 11/1985 | Kiyotomo | B29C 33/442 | 249/67 |
| 4,784,814 A * | 11/1988 | Diethelm | B29C 33/04 | 264/102 |
| 4,789,328 A * | 12/1988 | Knoll | B29C 43/04 | 425/384 |
| 5,032,206 A * | 7/1991 | Sigerist | B29C 66/81 | 100/237 |
| 5,044,918 A * | 9/1991 | Brussel | B29C 43/36 | 425/397 |
| 5,132,166 A * | 7/1992 | Adams | A45C 5/02 | 156/176 |
| 5,151,277 A * | 9/1992 | Bernardon | B29C 33/302 | 249/155 |
| 5,468,315 A * | 11/1995 | Okada | B30B 15/064 | 100/220 |
| 5,470,590 A * | 11/1995 | Brubaker | A47C 7/18 | 249/155 |
| 5,546,313 A * | 8/1996 | Masters | B29C 33/302 | 249/155 |
| 5,618,567 A * | 4/1997 | Hara | B29C 33/0033 | 425/111 |
| 5,686,038 A * | 11/1997 | Christensen | B29C 33/10 | 264/257 |
| 5,702,733 A * | 12/1997 | Enami | B21D 5/0209 | 264/313 |
| 5,783,132 A * | 7/1998 | Matsumoto | B29C 70/46 | 156/222 |
| 5,851,563 A * | 12/1998 | Hoffman | B28B 7/02 | 425/175 |
| 5,908,524 A * | 6/1999 | Masui | B29C 51/082 | 156/212 |
| 6,209,380 B1 * | 4/2001 | Papazian | B21D 37/02 | 72/413 |
| 6,298,896 B1 * | 10/2001 | Sherrill | B29C 33/0011 | 156/581 |
| 6,365,084 B1 * | 4/2002 | Terajima | B29C 43/021 | 264/257 |
| 6,484,776 B1 * | 11/2002 | Meilunas | B29C 70/386 | 156/213 |
| 6,578,399 B1 * | 6/2003 | Haas | B21D 22/10 | 72/342.1 |
| 6,923,635 B2 * | 8/2005 | Burgess | B29C 33/0011 | 249/120 |
| 7,454,940 B2 * | 11/2008 | Saitou | B21D 22/06 | 72/348 |
| 7,997,891 B2 * | 8/2011 | Gallagher | B29C 33/0011 | 264/553 |
| 8,057,206 B1 * | 11/2011 | McKnight | B29C 33/0011 | 249/161 |
| 8,097,196 B2 * | 1/2012 | Hijlkema | B28B 7/02 | 249/155 |
| 8,231,817 B2 * | 7/2012 | Bracke | B31D 3/0284 | 264/271.1 |
| 8,636,935 B2 * | 1/2014 | De Mattia | B29C 70/462 | 264/257 |
| 8,956,145 B2 * | 2/2015 | Johnson | A43B 17/00 | 425/394 |
| 9,427,898 B2 * | 8/2016 | Percival, Jr. | B29C 43/021 | |
| 9,511,402 B2 * | 12/2016 | Hayashi | B21D 37/16 | |
| 2001/0020757 A1* | 9/2001 | Fried | B29C 33/34 | 264/443 |
| 2003/0034588 A1* | 2/2003 | Miura | B29C 43/10 | 264/258 |
| 2003/0155685 A1* | 8/2003 | Spengler | B29C 43/36 | 264/250 |
| 2004/0041304 A1* | 3/2004 | Willden | B29C 70/342 | 264/324 |
| 2004/0043196 A1* | 3/2004 | Willden | B29C 43/12 | 428/174 |
| 2006/0249872 A1* | 11/2006 | Manuel | B22D 17/2218 | 264/225 |
| 2008/0115555 A1* | 5/2008 | Depase | B29C 70/345 | 72/343 |
| 2009/0065977 A1* | 3/2009 | Suzuki | B29C 43/203 | 264/339 |
| 2009/0142433 A1* | 6/2009 | Abeta | B29C 51/20 | 425/112 |
| 2011/0250384 A1* | 10/2011 | Sumi | B60R 5/044 | 428/118 |
| 2011/0303355 A1* | 12/2011 | Sumi | B32B 3/28 | 156/245 |
| 2011/0309547 A1* | 12/2011 | D'Acunto | B29C 33/306 | 264/293 |
| 2012/0267824 A1* | 10/2012 | Nothdurft | B29C 70/48 | 264/257 |
| 2014/0367889 A1* | 12/2014 | Halford | B29C 33/04 | 264/319 |
| 2015/0048551 A1* | 2/2015 | Halford | B29C 33/04 | 264/327 |
| 2015/0217354 A1* | 8/2015 | Iwanuma | B21D 22/208 | 72/309 |
| 2015/0224563 A1* | 8/2015 | Aso | B21D 22/26 | 428/595 |
| 2015/0273774 A1* | 10/2015 | Stips | B29C 70/865 | 428/99 |
| 2016/0354967 A1* | 12/2016 | Ono | B29C 51/082 | |

FOREIGN PATENT DOCUMENTS

| | | |
|---|---|---|
| JP | 03-126532 A | 5/1991 |
| JP | 07-164481 A | 6/1995 |
| JP | 08-238638 A | 9/1996 |
| JP | 09-039010 A | 2/1997 |
| JP | 09-039011 | 2/1997 |
| JP | 2006-123402 A | 5/2006 |
| JP | 2014-166702 A | 9/2014 |

OTHER PUBLICATIONS

Office Action for JP Patent Application No. 2015-113978, dated Jan. 22, 2019, 03 pages of Office Action and pages 03 of English Translation.

* cited by examiner

METHOD FOR PRODUCING RESIN MOLDED BODY AND PRESS MOLDING APPARATUS

CROSS-REFERENCE TO RELATED APPLICATIONS

The present application claims priority from Japanese Patent Application No. 2015-113978 filed on Jun. 4, 2015, the entire contents of which are hereby incorporated by reference.

BACKGROUND

1. Technical Field

The present disclosure relates to a method for producing a fiber-reinforced resin molded body and a press molding apparatus in which a fiber-reinforced resin molded body is press-molded using a plate-like molding matrix.

2. Related Art

Conventionally, structural parts of an automobile body have been formed of metal materials such as steel materials. These days, in order to reduce the weight of the car body, structural parts with three-dimensional shapes made of fiber-reinforced resins such as carbon fiber-reinforced plastics (CFRPs) are increasingly used. A structural part made of a fiber-reinforced resin is produced by, for example, heating and softening a plate-like molding matrix in which fiber-reinforced resin sheets containing reinforcing fibers impregnated with a thermoplastic matrix resin are stacked and then performing press molding using a mold (see Japanese Unexamined Patent Application Publication 2014-166702).

In the press molding of a fiber-reinforced resin molded body, when a heated and softened molding matrix is set directly on the molding surface of a mold, the cooling and solidifying of the thermoplastic resin starts to proceed from immediately after the setting. When a resin molded body having a three-dimensional shape is produced by press molding, the cooling and solidifying of the thermoplastic resin from immediately after the setting of the molding matrix may be a factor in the reduction of the moldability of the molding matrix, in view of the fact that the molding surface of the mold used has a concave-convex shape.

Specifically, in the case where the molding surface of a lower mold has a downward convex shape, when a molding matrix is set while the end of the molding matrix and the end of the molding surface of the lower mold are aligned together, the fluidity of the material in an end-side area of the molding matrix is limited due to the cooling and solidifying. Consequently, during pressing, the density of the material in the portion molded into a concave-convex shape may be reduced, or the molding matrix may crack.

Furthermore, in the case where the molding surface of a lower mold has an upward convex shape, when a heated and softened molding matrix is set, an end droops downward, and hence it is difficult to make the end of the molding matrix and the end of the molding surface agree. Furthermore, when pressing is performed while the end of the molding matrix and the end of the molding surface are made to agree, creases may occur in the molding matrix depending on the length of the molding matrix and the length of the molded body.

SUMMARY OF THE INVENTION

The present invention is made in view of the issue mentioned above, and an object of the present invention is to provide a method for producing a fiber-reinforced resin molded body and a press molding apparatus that can improve the moldability in producing a fiber-reinforced resin molded body by press-molding a plate-like molding matrix.

According to an aspect of the present invention, it is desirable to provide a method for producing a fiber-reinforced resin molded body in which a fiber-reinforced resin molded body having a three-dimensional shape is produced by press-molding a heated and softened plate-like molding matrix using a mold, the method sequentially including: (A) a step that sets the plate-like molding matrix on a lower mold including a pad in a central portion and mold main bodies on both sides of the pad by mounting a central portion of the plate-like molding matrix on the pad and causing at least one of both end sides of the plate-like molding matrix to be supported by at least one support protruding upward from a molding surface of at least one of the mold main bodies; (B) a step that brings an upper mold and the lower mold close together to cause the central portion of the plate-like molding matrix to be sandwiched by the pad and the upper mold; (C) a step that brings the upper mold and the lower mold still closer together to reduce the amount of protrusion of the at least one support; and (D) a step that presses the plate-like molding matrix by using the lower mold and the upper mold to form the fiber-reinforced resin molded body.

In the step (A), at least one end of the plate-like molding matrix in an area supported by the at least one support may be located on an outside of at least one shear edge provided in at least one of the mold main bodies. In the step (C), the amount of protrusion of the at least one support may be reduced to bring the at least one end of the plate-like molding matrix down to an inside of the at least one shear edge.

The plate-like molding matrix may be made of a fiber-reinforced resin in which reinforcing fibers oriented in one direction are impregnated with a matrix resin. In the step (A), a central portion in a direction crossing the one direction may be mounted on the pad and at least one of the both end sides in the direction crossing the one direction maybe caused to be supported by the at least one support.

In the step (D), the pressing may be performed after the at least one support recedes to the molding surface of at least one of the mold main bodies.

In the step (A), an upper surface of the pad and an upper surface of the at least one support may be located above the molding surfaces of the mold main bodies, the plate-like molding matrix may be set on the pad and the at least one support while an area of the plate-like molding matrix between a portion mounted on the pad and a portion caused to be supported by the at least one support is supported by at least one conveyance tool, and then the at least one conveyance tool may be pulled out from a space between the pad and the at least one support.

According to another aspect of the present invention, it is desirable to provide a press molding apparatus for producing a fiber-reinforced resin molded body having a three-dimensional shape by press-molding a heated and softened plate-like molding matrix using a mold, the press molding apparatus including: a pad that is disposed in a central portion in one direction of a lower mold and to which a load is applied upward; mold main bodies that are disposed on both sides in the one direction of the lower mold across the pad and have molding surfaces in positions below an upper surface of the pad; and at least one support that protrudes upward from at least one of the molding surfaces of the mold main bodies and of which the amount of protrusion decreases as an upper mold and the lower mold come closer together.

When the upper mold and the lower mold come close together, at least one part to be pushed that is coupled to the at least one support of the lower mold may be pushed by at least one pushing part that is provided in the upper mold and thereby the amount of protrusion of the at least one support decreases.

A distance between the at least one pushing part of the upper mold and the at least one part to be pushed of the lower mold may be shorter than a distance between the pad and the upper mold.

The press molding apparatus may further include at least one elastic part that applies a load to the at least one pushing part of the upper mold downward.

An upper surface of the at least one support may be a curved surface protruding upward.

DETAILED DESCRIPTION

Figure 1:
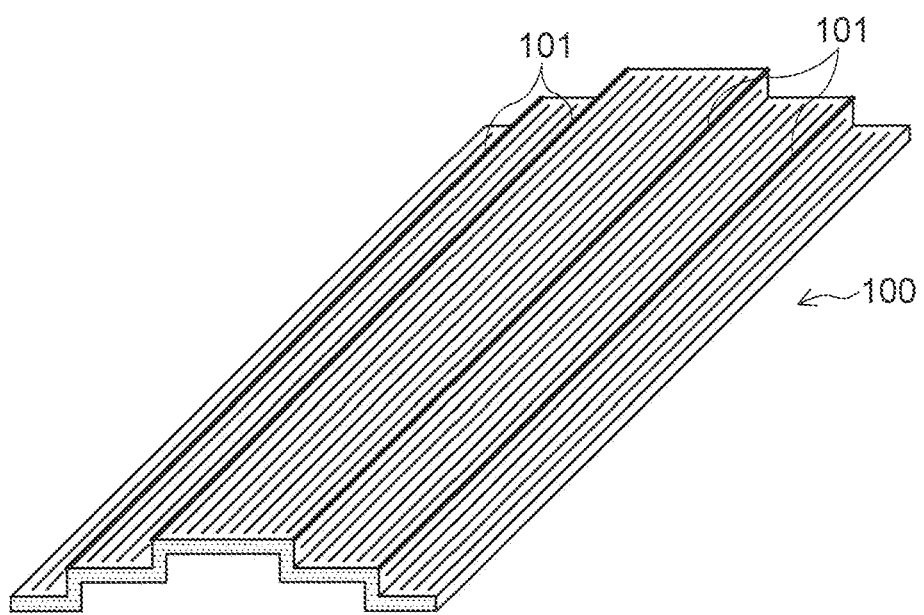
FIG. 1 is a perspective view illustrating an example of a fiber-reinforced resin molded body.

Hereinafter, preferred implementations of the present disclosure will be described in detail with reference to the appended drawings. Note that, in this specification and the appended drawings, structural elements that have substantially the same function and structure are denoted with the same reference numerals, and repeated description of these structural elements is omitted.

<1. Fiber-Reinforced Resin Molded Body>

FIG. 1 is a perspective view illustrating an example of a fiber-reinforced resin molded body 100 that can be produced by a method for producing a fiber-reinforced resin molded body according to an implementation. The fiber-reinforced resin molded body 100 is molded using a fiber-reinforced resin, and has a higher strength while having a lighter weight than a structure body formed of a steel plate. The fiber-reinforced resin molded body 100 has a three-dimensional shape including concave-convex portions.

A plate-like molding matrix used for the press molding of the fiber-reinforced resin molded body 100 has a thickness of, for example, 1.0 to 10.0 mm. As the plate-like molding matrix, for example, a stacked structure of a plurality of fiber-reinforced resin sheets containing reinforcing fibers impregnated with a matrix resin may be used. The reinforcing fibers used are not particularly limited, and may be, for example, carbon fibers, glass fibers, aramid fibers, or the like, or these reinforcing fibers may be used in combination. In particular, carbon fibers are excellent in mechanical properties, and thus the reinforcing fibers should preferably contain carbon fibers.

In the implementation, continuous fibers that are continuous from one end to the other end are used as the reinforcing fibers contained in the plate-like molding matrix. For example, a plate-like molding matrix in which a plurality of fiber-reinforced resin sheets containing reinforcing fibers oriented along one direction are stacked is press-molded, and thus the fiber-reinforced resin molded body 100 is produced. The extending direction of a corner 101 in the three-dimensional shape of the fiber-reinforced resin molded body 100 illustrated in FIG. 1 substantially agrees with the orientation direction of the reinforcing fibers.

A thermoplastic resin is used as the matrix resin of the fiber-reinforced resin. As the matrix resin, for example, a polyethylene resin, a polypropylene resin, a polyvinyl chloride resin, an ABS resin, a polystyrene resin, an AS resin, a polyamide resin, a polyacetal resin, a polycarbonate resin, a thermoplastic polyester resin, a PPS (polyphenylene sulfide) resin, a fluorine resin, a polyetherimide resin, a polyetherketone resin, a polyimide resin, and the like are illustrated.

The matrix resin may use one or a mixture of two or more of these thermoplastic resins. Alternatively, the matrix resin may be a copolymer of these thermoplastic resins. In the case where the matrix resin is a mixture of these thermoplastic resins, a compatibilizing agent may be used in combination. The matrix resin may contain a bromine-based fire retardant, a silicon-based fire retardant, red phosphorus, or the like as a fire retardant.

In this case, as the thermoplastic resin used, for example, polyolefin-based resins such as polyethylene and polypropylene, polyamide-based resins such as nylon 6 and nylon 66, polyester-based resins such as polyethylene terephthalate and polybutylene terephthalate, and resins such as a polyetherketone, a polyethersulfone, and an aromatic polyamide are given. In particular, the thermoplastic matrix resin should preferably be at least one selected from the group consisting of a polyamide, polyphenylene sulfide, polypropylene, a polyetheretherketone, and a phenoxy resin.

In the case where the fiber-reinforced resin molded body 100 is molded using a plurality of fiber-reinforced resin sheets stacked, the types, content ratios, etc. of the reinforcing fibers contained in the fiber-reinforced resin sheets may be different. In the plurality of fiber-reinforced resin sheets stacked, the matrix resins may be different materials having compatibility, or different additives etc. may be mixed in with the same matrix resin. Also in this case, matrix resins with close melting points should preferably be used so that the melting and hardening of the molding matrix can be performed efficiently.

The fiber-reinforced resin sheet is produced by, for example, a method in which a matrix resin is impregnated into reinforcing fibers while the reinforcing fibers are continuously fed, based on the process of a common film impregnation method, melt impregnation method, or the like. The fiber-reinforced resin sheet is cut to a desired size, and thus a fiber-reinforced resin sheet as a molding material is obtained. End portions in the width direction of a plurality of fiber-reinforced resin sheets cut in a desired size may be joined together by an adhesive or the like, and thus fiber-reinforced resin sheets with a desired width and length are formed. The thickness of the fiber-reinforced resin sheet may be, for example, a value in the range of 0.03 to 0.5 mm.

In the implementation, a plate-like molding matrix in which a plurality of fiber-reinforced resin sheets are stacked is heated and softened, and then the plate-like molding matrix is mold-compressed with a press molding apparatus; thereby, the fiber-reinforced resin molded body 100 having a desired three-dimensional shape is obtained. However, the plate-like molding matrix is not limited to a stacked body of fiber-reinforced resin sheets, and may be a single layer of a molding matrix having a prescribed thickness. In the following, an example of the press molding apparatus that can be used to produce the fiber-reinforced resin molded body 100 is described, and then a method for producing the fiber-reinforced resin molded body 100 using the press molding apparatus is described.

<2. Press Molding Apparatus>

Figure 2:
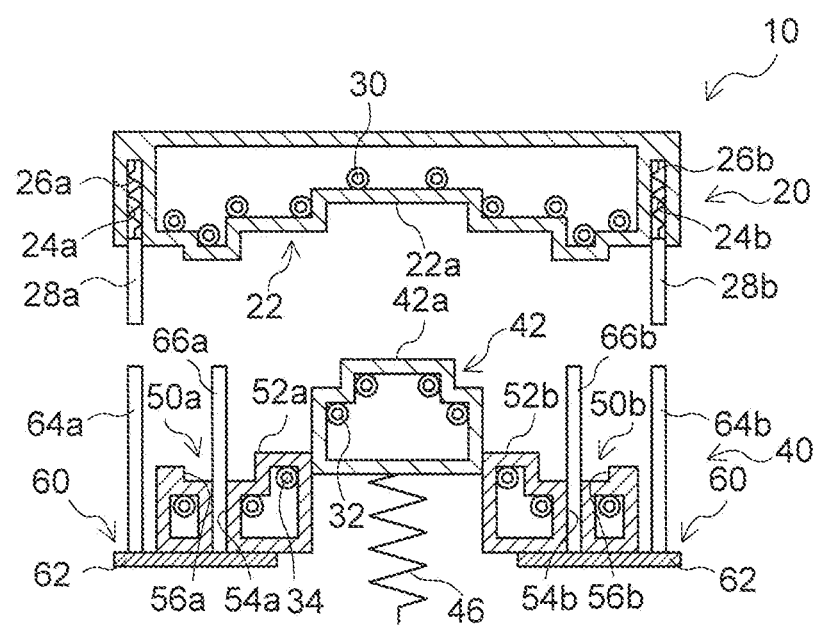
FIG. 2 illustrates a press molding apparatus according to an implementation of the present invention.

FIG. 2 illustrates a configuration example of a press molding apparatus 10 according to the implementation. FIG. 2 illustrates a cross-sectional view of the press molding apparatus 10 for producing the fiber-reinforced resin molded body 100 illustrated in FIG. 1. The press molding apparatus 10 is an apparatus that includes an upper mold 20 and a lower mold 40 and produces the fiber-reinforced resin molded body 100 with a desired shape by sandwiching and pressing a plate-like molding matrix by using the upper mold 20 and the lower mold 40.

In the following description, a "central portion" and "both end portions" of the upper mold 20 and the lower mold 40 refer to a central portion and both end portions in the left and right direction of the press molding apparatus 10 illustrated in FIG. 2 etc., that is, a central portion and both end portions in a direction crossing the extending direction of the corner 101 of the fiber-reinforced resin molded body 100 illustrated in FIG. 1. The left and right direction of the press molding apparatus 10 or a direction orthogonal to the extending direction of the corner 101 of the fiber-reinforced resin molded body 100 may be referred to as the width direction.

(2-1. Upper Mold)

The upper mold 20 has, on the surface facing the lower mold 40, a molding surface 22 corresponding to the three-dimensional shape of the fiber-reinforced resin molded body 100 to be produced. On the back side of the molding surface 22, a heat source such as a heater for heating and keeping warm the mold is embedded. Further, on the back side of the molding surface 22, coolant passages 30 through which coolant circulates may be provided. When the volume of the molding matrix is large and the mold receives too much heat, coolant may be circulated through the coolant passages 30, and thereby the molding surface 22 can be made at low temperature and the heated and softened molding matrix can be cooled and solidified.

In both end portions of the upper mold 20, pushing parts 28a and 28b that are held movably forward and backward through pushing part support holes 24a and 24b are provided. The pushing parts 28a and 28b are suspended in the pushing part support holes 24a and 24b by coil springs 26a and 26b. The coil springs 26a and 26b serve as a pressure applicator that is capable of applying a load to the pushing parts 28a and 28b downward. The pressure applicator is not limited to the coil springs 26a and 26b, and may be leaf springs or the like or may be formed using other pressure supply sources. In one implementation, the coil springs 26a and 26b may serve as elastic parts of the appended claims in the present implementation.

In the implementation, the pushing parts 28a and 28b are formed of a stick-like pin. Although in FIG. 2 one pushing part 28a and one pushing part 28b are illustrated individually in both end portions of the upper mold 20, a plurality of pushing parts 28a and a plurality of pushing parts 28b are provided in the depth direction of the drawing. In the press molding apparatus 10 according to the implementation, the upper mold 20 is configured movably forward and backward in the vertical direction, and is designed such that a downward load is applied to the upper mold 20 during press molding.

(2-2. Lower Mold)

The lower mold 40 includes a pad 42, mold main bodies 50a and 50b, and a support mechanism 60. The pad 42 is provided in the central portion of the lower mold 40, and a load is applied to the pad 42 upward by a coil spring 46. The pad 42 has, on the upper surface facing the upper mold 20, a pad molding surface 42a corresponding to the shape of the central portion of the fiber-reinforced resin molded body 100 to be produced. On the back side of the pad molding surface 42a, a heat source such as a heater for heating and keeping warm the mold is embedded. Further, on the back side of the pad molding surface 42a, coolant passages 32 through which coolant circulates may be provided. When the volume of the molding matrix is large and the mold receives too much heat, coolant may be circulated through the coolant passages 32, and thereby the pad molding surface 42a can be made at low temperature and the heated and softened molding matrix can be cooled and solidified.

The mold main bodies 50a and 50b are provided on both end sides of the lower mold 40 across the pad 42. The mold main bodies 50a and 50b have, on the upper surface facing the upper mold 20, molding surfaces 52a and 52b corresponding to the shapes of both end portions of the fiber-reinforced resin molded body 100 to be produced. Shear edges 56a and 56b are provided at the ends on the outside of the molding surfaces 52a and 52b in order that, during the press molding of the molding matrix, the molding matrix may be mold-compressed without protruding outside the molding surface. On the back side of the molding surfaces 52a and 52b, a heat source such as a heater for heating and keeping warm the mold is embedded. Further, on the back side of the molding surfaces 52a and 52b, coolant passages 34 through which coolant circulates may be provided. When the volume of the molding matrix is large and the mold receives too much heat, coolant may be circulated through the coolant passages 34, and thereby the molding surfaces 52a and 52b can be made at low temperature and the heated and softened molding matrix can be cooled and solidified.

The pad 42 is disposed between the mold main bodies 50a and 50b via minute gaps. The pad 42 is vertically movable relative to the mold main bodies 50a and 50b. In the state before press molding, the height position of the pad molding surface 42a is higher than the height position of the molding surfaces 52a and 52b of the mold main bodies 50a and 50b. During press molding, the upper mold 20 and the lower mold 40 come close together, and accordingly the molding matrix is compressed by the pad molding surface 42a and a surface 22a of the central portion of the upper mold 20 facing the pad molding surface 42a; at this time, the pad 42 is forced downward against the biasing force of the coil spring 46.

The support mechanism 60 includes a substrate 62, supports 66a and 66b that are fixed to the upper surface of the substrate 62, and parts to be pushed 64a and 64b. The support mechanism 60 is biased upward by a not-illustrated load medium, and the support mechanism 60 is vertically movable relative to the mold main bodies 50a and 50b. The load medium that biases the support mechanism 60 is not particularly limited, and may be, for example, one using a coil spring, a leaf spring, or the like or may be one using some other pressure supply source such as a hydraulic cylinder.

The supports 66a and 66b are portions that support the end sides of the plate-like molding matrix. In the state before press molding, the supports 66a and 66b protrude upward from the molding surfaces 52a and 52b of the mold main bodies 50a and 50b. The supports 66a and 66b are held by support holding holes 54a and 54b provided in the mold main bodies 50a and 50b.

The parts to be pushed 64a and 64b are portions provided in order to move the support mechanism 60 relatively downward when the upper mold 20 and the lower mold 40 are brought close together. The upper surfaces of the parts to be pushed 64a and 64b face the lower surfaces of the pushing parts 28a and 28b of the upper mold 20, and when the upper mold 20 and the lower mold 40 are brought close together, the parts to be pushed 64a and 64b of the lower mold 40 can be pushed by the pushing parts 28a and 28b of the upper mold 20. When the magnitude of the load that pushes the parts to be pushed 64a and 64b is more than the magnitude of the load that biases the support mechanism 60 upward, the support mechanism 60 moves downward.

In the press molding apparatus 10 according to the implementation, the mold main bodies 50a and 50b are fixed, and the pad 42 and the support mechanism 60 move vertically relative to the mold main bodies 50a and 50b. The pad 42 and the support mechanism 60 are vertically movable independently of each other. In the state before press molding, a portion of the pad molding surface 42a located uppermost and the upper surface of the supports 66a and 66b are substantially at the same height.

Figure 3:
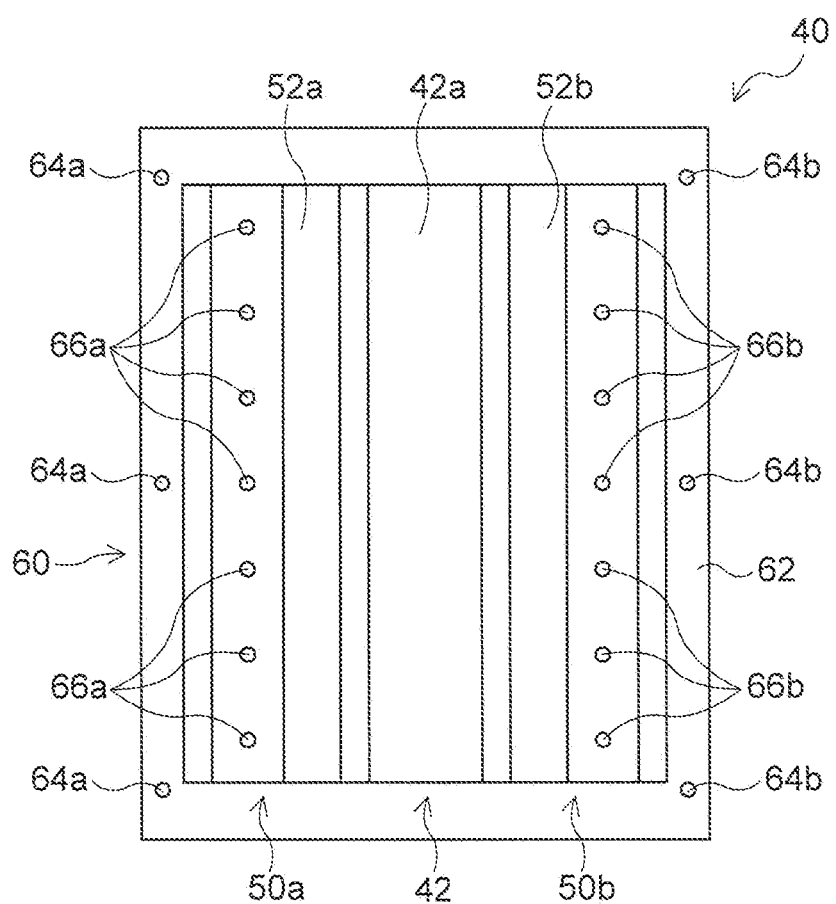
FIG. 3 is a top view illustrating a lower mold of the press molding apparatus according to the implementation.

FIG. 3 illustrates a top view of the lower mold 40 of the press molding apparatus 10 according to the implementation as viewed from the upper mold 20 side. The lower mold 40 is a mold for molding the fiber-reinforced resin molded body 100 illustrated in FIG. 1, and includes the pad 42 in the central portion and the mold main bodies 50a and 50b on both sides of the pad 42. The pad 42 and the mold main bodies 50a and 50b have a long-length planar shape. The mold main bodies 50a and 50b have a plurality of support holding holes 54a and 54b that hold the supports 66a and 66b of the support mechanism 60. The parts to be pushed 64a and 64b of the support mechanism 60 are provided on the outside of the pad 42 and the mold main bodies 50a and 50b.

Figure 4:
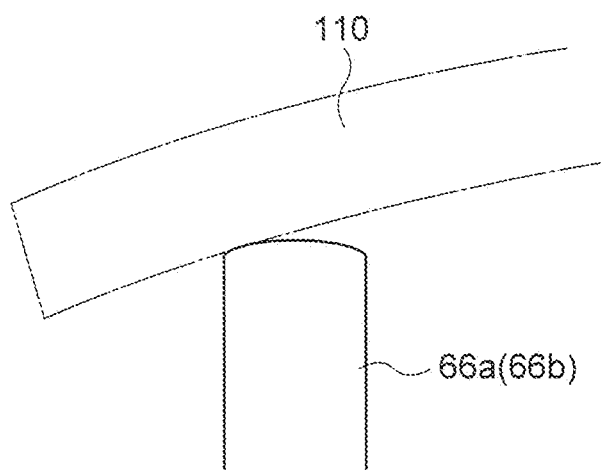
FIG. 4 illustrates a support of the press molding apparatus according to the implementation.

In the press molding apparatus 10 according to the implementation, the supports 66a and 66b of the support mechanism 60 are formed of a stick-like pin. When the supports 66a and 66b are pins, the molding matrix can be supported with a small area. Therefore, the deviation of the molding matrix during press molding can be suppressed. At this time, as illustrated in FIG. 4, the upper surface of the supports 66a and 66b should preferably be a curved surface protruding upward. When the upper surface of the supports 66a and 66b is a curved surface, a molding matrix 110 can be prevented from being caught on the supports 66a and 66b even when the molding matrix 110 on the supports 66a and 66b is trailed during press molding.

In the press molding apparatus 10 according to the implementation, the parts to be pushed 64a and 64b of the support mechanism 60 are formed of a stick-like pin. It is sufficient for the parts to be pushed 64a and 64b to be able to be in contact with the pushing parts 28a and 28b of the upper mold 20 when the upper mold 20 and the lower mold 40 are brought close together. However, by forming the supports 66a and 66b and the parts to be pushed 64a and 64b out of a stick-like pin, the weight of the support mechanism 60 can be reduced, and the cost can be suppressed.

In the example illustrated in FIG. 3, the supports 66a and 66b are provided 7 in number in the mold main bodies 50a and 50b, respectively, i.e. 14 in total, and the parts to be pushed 64a and 64b are provided 3 in number at both ends, respectively, i.e. 6 in total. However, the numbers of supports 66a and 66b and parts to be pushed 64a and 64b are not particularly limited. The substrate 62 of the support mechanism 60 has a not-illustrated opening below the pad 42 and the mold main bodies 50a and 50b, and a coil spring 46 that applies a load to the pad 42 is provided through the opening. Other pressure supply sources may be used in place of the coil spring 46.

<3. Method for Producing a Fiber-Reinforced Resin Molded Body>

Next, a method for producing the fiber-reinforced resin molded body 100 performed using the press molding apparatus 10 described above is described. The method for producing the fiber-reinforced resin molded body 100 according to the implementation relates to a method in which the fiber-reinforced resin molded body 100 is molded by pressing, using a mold, a molding matrix in which fiber-reinforced resin sheets containing reinforcing fibers impregnated with a matrix resin are stacked.

The method for producing the fiber-reinforced resin molded body 100 according to the implementation includes at least steps (A) to (D) below:

(A) a step that sets the plate-like molding matrix 110 on the lower mold 40 including the pad 42 in the central portion and the mold main bodies 50a and 50b on both sides of the pad 42 by mounting the central portion of the plate-like molding matrix 110 on the pad 42 and causing both end sides of the plate-like molding matrix 110 to be supported by the supports 66a and 66b protruding upward from the molding surfaces 52a and 52b of the mold main bodies 50a and 50b, (B) a step that brings the upper mold 20 and the lower mold 40 close together to cause the central portion of the plate-like molding matrix 110 to be sandwiched by the pad 42 and the upper mold 20, (C) a step that brings the upper mold 20 and the lower mold 40 still closer together to reduce the amount of protrusion of the supports 66a and 66b, and (D) a step that presses the plate-like molding matrix 110 by using the lower mold 40 and the upper mold 20 to form the fiber-reinforced resin molded body 100.

A method for producing the fiber-reinforced resin molded body 100 having a three-dimensional shape illustrated in FIG. 1 will now be described in order of steps, with reference to FIG. 5 to FIG. 12 as appropriate.

(3-1. Heating Process)

The heating process is a process that heats and softens the plate-like molding matrix 110. In the heating process, for example, the plate-like molding matrix 110 is put into a heating apparatus. In the implementation, a plate-like molding matrix 110 in which fiber-reinforced resin sheets each containing continuous fibers oriented in one direction are stacked arbitrarily is used. The shape of the plate-like molding matrix 110 substantially agrees with the developed shape of the fiber-reinforced resin molded body 100, and therefore the length in the width direction of the molding matrix 110 is longer than the length in the width direction of the fiber-reinforced resin molded body 100. In the implementation, the shear edges 56a and 56b are provided in the lower mold 40, and the molding matrix 110 is mold-compressed in the molding area. Therefore, in the fiber-reinforced resin molded body 100 that is molded, the reduction in the filling rate of the resin material and molding defects such as cracking are lessened.

In the heating process, for example, the plate-like molding matrix 110 is heated from the upper surface side and the lower surface side by a heating medium such as a heating wire, a far-infrared heater, or hot air. The temperature of the heating medium is set not less than the melting point of the matrix resin. In the heating process, the molding matrix 110 is set in a molten state so that the matrix resin does not decompose. The heating apparatus used is not particularly limited.

(3-2. Pressing Process)

The pressing process includes steps (A) to (D) mentioned above, and is a process that presses the plate-like molding matrix 110 in a molten state to produce the fiber-reinforced resin molded body 100 having a desired three-dimensional shape. In the pressing process, the surface temperature of the upper mold 20 and the lower mold 40 of the press molding apparatus 10 is set less than the melting point of the matrix resin. In the pressing process, the molding matrix 110 in a molten state is set on the lower mold 40, and then the upper mold 20 and the lower mold 40 facing each other are brought close together to press the molding matrix 110. Thereby, the molding matrix 110 is cooled and solidified, and the fiber-reinforced resin molded body 100 with a desired shape is obtained.

(3-2-1. Step (A))

Figure 5:
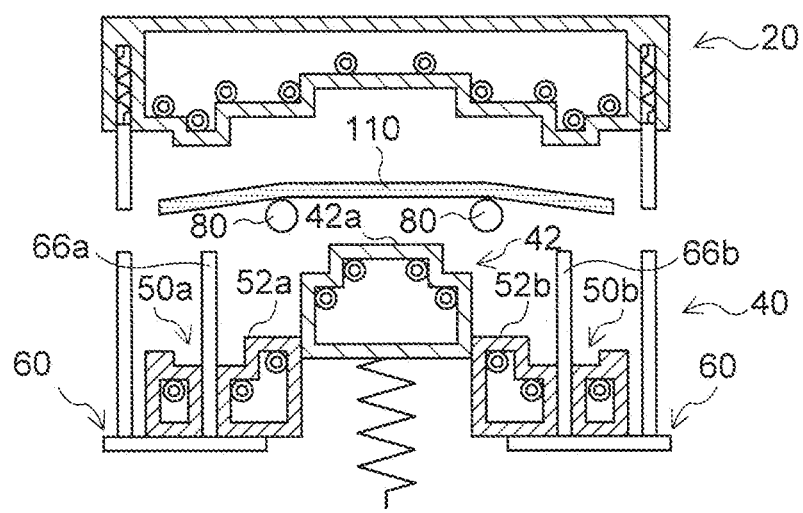
FIG. 5 illustrates step (A) of a method for producing a fiber-reinforced resin molded body according to the implementation.
Figure 6:
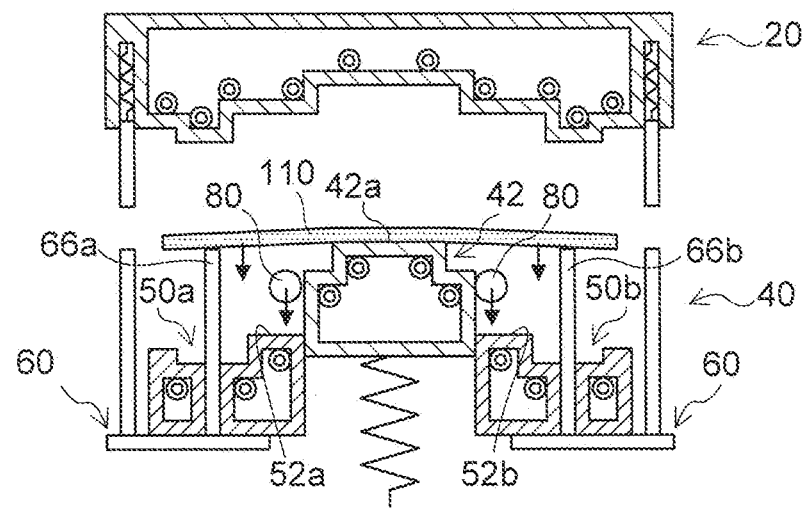
FIG. 6 illustrates step (A) of a method for producing a fiber-reinforced resin molded body according to the implementation.

Step (A) is a step that sets the molding matrix 110 on the lower mold 40. FIG. 5 and FIG. 6 illustrate a manner of step (A). First, as illustrated in FIG. 5, the heated and softened plate-like molding matrix 110 in a molten state is supported by conveyance tools 80, and is conveyed onto the lower mold 40. At this time, the pad molding surface 42a of the lower mold 40 and the upper surface of the supports 66a and 66b are located above the height position of the molding surfaces 52a and 52b of the mold main bodies 50a and 50b. In the example illustrated in FIG. 5, the height positions of the pad molding surface 42a and the upper surface of the supports 66a and 66b substantially agree. The height position of the pad molding surface 42a and the height position of the upper surface of the supports 66a and 66b may not agree exactly.

The conveyance tools 80 are a plurality of (in the drawing, two) conveyance pins that extend in the longitudinal direction of the long-length pad 42 and support the plate-like molding matrix 110 through the total length. It is preferable that at least the upper surface of the conveyance tool 80 be formed in a curved surface form. Therefore, a recess is less likely to occur on the lower surface of the molding matrix 110 during conveyance. The molding matrix 110 in a molten state experiences small bending in the state of being supported by the conveyance tools 80, but is conveyed onto the lower mold 40 without contact with the upper mold 20 or the lower mold 40. The molding matrix 110 may be conveyed by an operator capturing the conveyance tool 80, or the molding matrix 110 may be conveyed using a conveyance apparatus including the conveyance tool 80.

The two conveyance tools 80 support the molding matrix 110 individually in the positions corresponding to the areas between the pad 42 and the mold main bodies 50a and 50b of the lower mold 40. Thus, as illustrated in FIG. 6, after the molding matrix 110 is conveyed onto the lower mold 40, the conveyance tools 80 are lowered, and thereby the molding matrix 110 is set on the pad molding surface 42a and the supports 66a and 66b. The conveyance tools 80 are pulled out from the gaps between the pad 42 and the mold main bodies 50a and 50b in the axial direction.

At this time, the distance between the two conveyance tools 80 may be made to agree with the width of the pad 42, and thereby the positioning of the molding matrix 110 can be made accurately at the time of setting the molding matrix 110. Specifically, when the mounting position of the molding matrix 110 with respect to the conveyance tools 80 is determined in advance, even if the positions of the conveyance tools 80 above the lower mold 40 are deviated, the conveyance tools 80 go down along both sides of the pad 42 while correcting the positions at the time of lowering the conveyance tools 80, and the molding matrix 110 is set to a prescribed position.

(3-2-2. Step (B))

Figure 7:
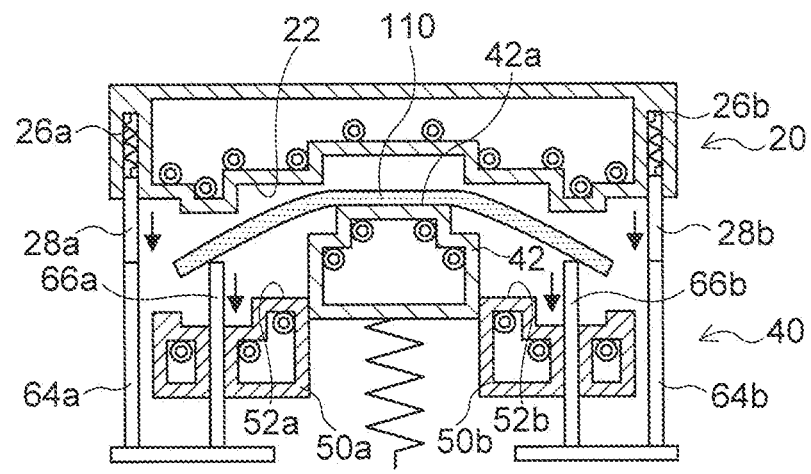
FIG. 7 illustrates step (B) of a method for producing a fiber-reinforced resin molded body according to the implementation.
Figure 8:
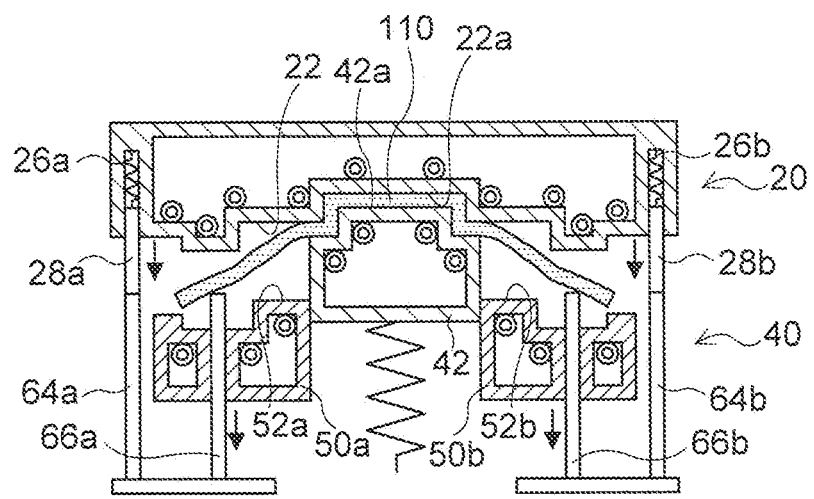
FIG. 8 illustrates step (B) of a method for producing a fiber-reinforced resin molded body according to the implementation.

Step (B) is a step that brings the upper mold 20 and the lower mold 40 close together to cause the central portion of the plate-like molding matrix 110 to be sandwiched by the pad molding surface 42a and the surface 22a of the central portion of the upper mold 20. FIG. 7 and FIG. 8 illustrate a manner of step (B). In the press molding apparatus 10 according to the implementation, by applying a load to the upper mold 20 downward, the upper mold 20 moves downward, and the upper mold 20 and the lower mold 40 come close together.

When the upper mold 20 goes down to a prescribed level, as illustrated in FIG. 7, the pushing parts 28a and 28b of the upper mold 20 come into contact with the parts to be pushed 64a and 64b of the lower mold 40. Therefore, by continuing lowering the upper mold 20, the support mechanism 60 of the lower mold 40 is pushed downward. At this time, the distance between the pushing parts 28a and 28b of the upper mold 20 and the parts to be pushed 64a and 64b of the lower mold 40 is shorter than the distance between the pad 42 and the upper mold 20, and therefore the support mechanism 60 is pushed downward before the plate-like molding matrix 110 is sandwiched. Thereby, the supports 66a and 66b start to go down, and the end sides of the plate-like molding matrix 110 start to droop downward. At this time, the central portion of the plate-like molding matrix 110 mounted on the pad 42 is not in contact with the upper mold 20.

When the upper mold 20 is moved further downward, as illustrated in FIG. 8, the supports 66a and 66b of the lower mold 40 go further downward, and both end portions of the plate-like molding matrix 110 are lowered further downward. At this time, the coil springs 26a and 26b, which apply a load to the pushing parts 28a and 28b of the upper mold 20 downward, are compressed, and therefore the amount of fall of the supports 66a and 66b is smaller than the amount of fall of the upper mold 20 (the amount of stroke).

The central portion of the plate-like molding matrix 110 mounted on the pad 42 is pressed against the surface 22a of the central portion of the upper mold 20, and starts to receive pressure from the load of the pad 42. Thereby, the central portion of the plate-like molding matrix 110 starts to be cooled and solidified while being mold-compressed. After that, the upper mold 20 and the lower mold 40 are brought close together in the state where the central portion of the molding matrix 110 is sandwiched by the pad 42 and the upper mold 20.

During the press molding, the molding surface 22 of the upper mold 20, the molding surface 42a of the pad 42 of the lower mold 40, and the molding surfaces 52a and 52b of the mold main bodies 50a and 50b are heated or kept warm at a temperature less than the melting point of the matrix resin of the molding matrix 110. Therefore, the molding matrix 110 in a molten state, which has been preheated at not less than the melting point of the matrix resin, is cooled by contacting the molding surface of the upper mold 20 or the lower mold 40. As described above, when the volume of the molding matrix 110 is large, coolant may be circulated through the coolant passages 30, 32, and 34 to cool the molding matrix 110.

(3-2-3. Step (C))

Figure 9:
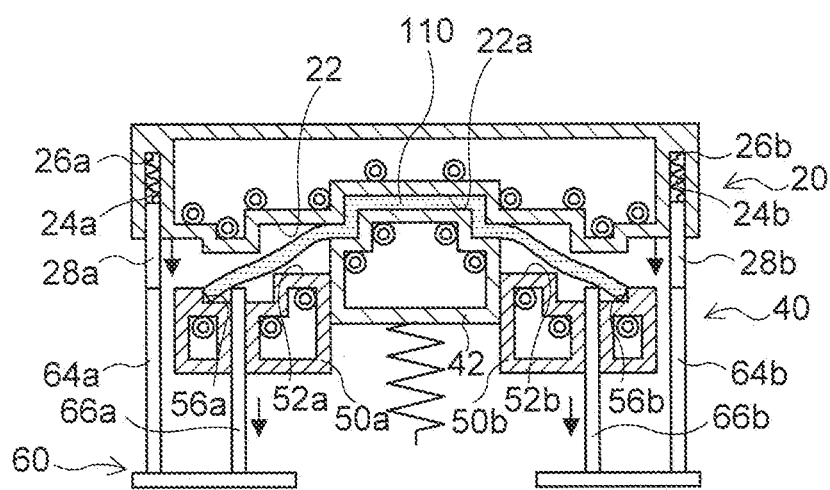
FIG. 9 illustrates step (C) of a method for producing a fiber-reinforced resin molded body according to the implementation.
Figure 10:
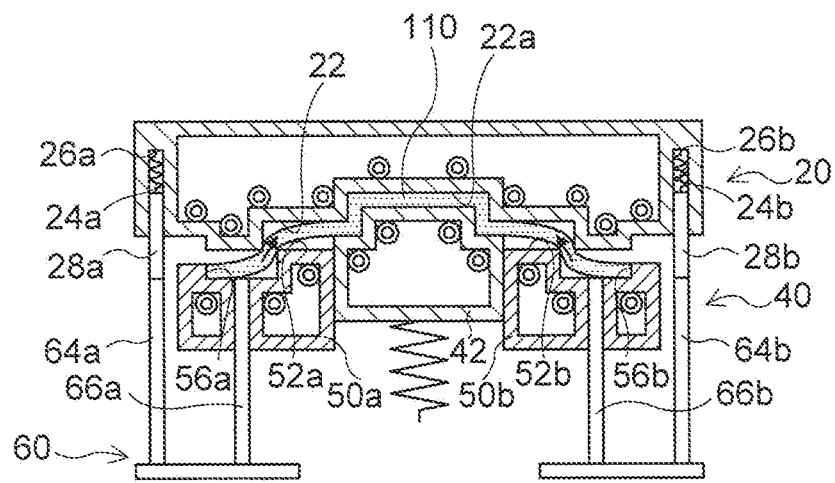
FIG. 10 illustrates step (C) of a method for producing a fiber-reinforced resin molded body according to the implementation.

Step (C) is a step that brings the upper mold 20 and the lower mold 40 still closer together to further reduce the amount of protrusion of the supports 66a and 66b from the molding surfaces 52a and 52b of the mold main bodies 50a and 50b. FIG. 9 and FIG. 10 illustrate a manner of step (C). After the central portion of the plate-like molding matrix 110 is sandwiched by the pad 42 and the upper mold 20 in the previous step (B), the upper mold 20 and the lower mold 40 are brought still closer together in this step (C), and thereby the support mechanism 60 is pushed further downward.

Thereby, the amount of protrusion of the supports 66a and 66b from the molding surfaces 52a and 52b of the mold main bodies 50a and 50b is further reduced. As a result of this, also the coil springs 26a and 26b, which apply a downward load to the pushing parts 28a and 28b of the upper mold 20, are further compressed. At this time, a height difference has been produced between, of the plate-like molding matrix 110, the central portion sandwiched by the pad 42 and the upper mold 20 and both end portions drooping downward, and both end portions of the plate-like molding matrix 110 are brought down to the positions of the shear edges 56a and 56b of the mold main bodies 50a and 50b.

During this time, the distance between the molding surface 22 of the upper mold 20 and the molding surfaces 52a and 52b of the mold main bodies 50a and 50b decreases gradually, and both end sides of the plate-like molding matrix 110 start to come into contact with the molding surface 22 of the upper mold 20 or the molding surfaces 52a and 52b of the mold main bodies 50a and 50b of the lower mold 40. Then, as illustrated in FIG. 10, both end portions of the plate-like molding matrix 110 are brought down to the positions of the shear edges 56a and 56b, and then the molding matrix 110 is sandwiched by the upper mold 20 and the lower mold 40 and is accordingly pushed to the central portion side. However, also in this process (C), the area with which both end sides of the plate-like molding matrix 110 are in contact with the upper mold 20 and the lower mold 40 is small, and the cooling and solidifying of the molding matrix 110 are less likely to proceed.

(3-2-4. Step (D))

Figure 11:
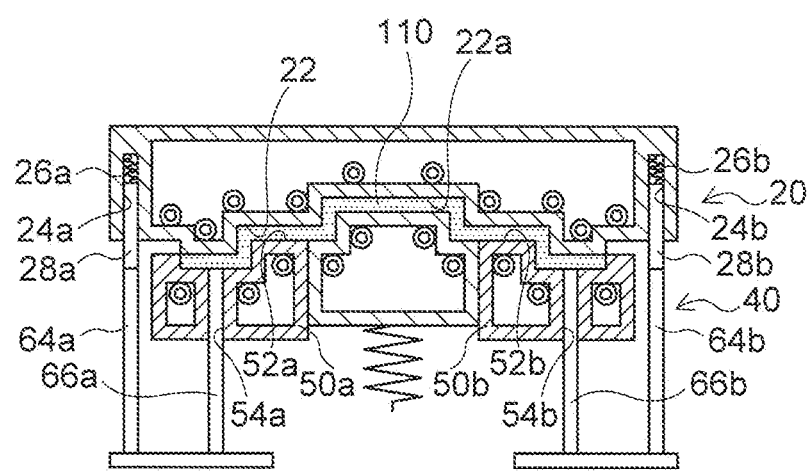
FIG. 11 illustrates step (D) of a method for producing a fiber-reinforced resin molded body according to the implementation.

Step (D) is a step that presses the molding matrix 110 by using the upper mold 20 and the lower mold 40 to form the fiber-reinforced resin molded body 100. FIG. 11 illustrates a manner of step (D). In this step (D), the upper mold 20 and the lower mold 40 are brought still closer together, and thereby the molding matrix 110 is mold-compressed in the closed space enclosed by the upper mold 20 and the lower mold 40. Thus, the molding matrix 110 is cooled and solidified wholly, and the fiber-reinforced resin molded body 100 is formed.

At this time, by the compression of the coil springs 26a and 26b, which apply a downward load to the pushing parts 28a and 28b of the upper mold 20, the height position of the upper surface of the supports 66a and 66b substantially agrees with the height position of the molding surfaces 52a and 52b of the mold main bodies 50a and 50b. Consequently, in the state where the molding matrix 110 is being mold-compressed, the upper surfaces of the supports 66a and 66b can be parts of the molding surface. Therefore, it is less likely that the marks of the support holding holes 54a and 54b will be left on the surface of the fiber-reinforced resin molded body 100.

Figure 12:
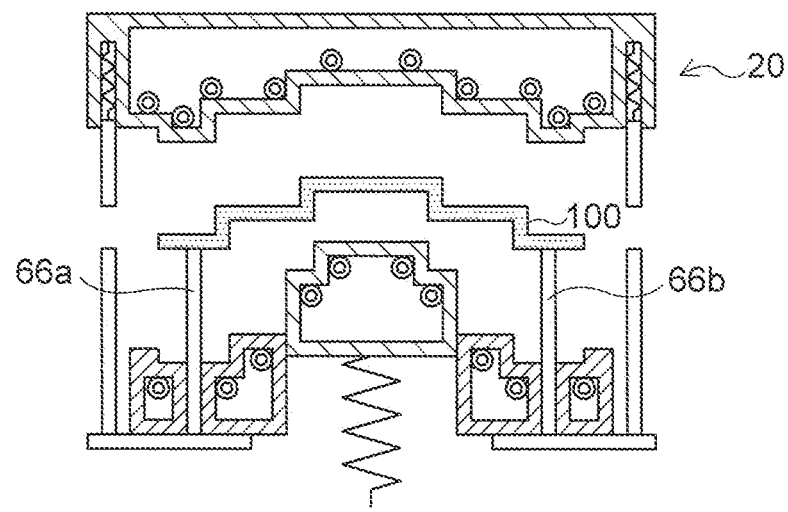
FIG. 12 illustrates step (E) of a method for producing a fiber-reinforced resin molded body according to the implementation.

The molding matrix 110 is kept in the mold-compressed state for a prescribed period, and then the upper mold 20 is raised and the fiber-reinforced resin molded body 100 that is molded is taken out. At this time, as illustrated in FIG. 12, the fiber-reinforced resin molded body 100 is in a state of being mounted on the supports 66a and 66b. Therefore, the conveyance tools are ready to be easily inserted into the space below the fiber-reinforced resin molded body 100, and the fiber-reinforced resin molded body 100 can be conveyed easily.

As described above, by the method for producing the fiber-reinforced resin molded body 100 and the press molding apparatus 10 according to the implementation, the central portion of the heated and softened plate-like molding matrix 110 is mounted on the pad 42, and both end portions are mounted on the supports 66a and 66b. Therefore, the time at which both end sides of the plate-like molding matrix 110 start to be cooled and solidified can be delayed. Thereby, the molding matrix 110 can keep the state of being softened until the molding matrix 110 is mold-compressed, and a reduction in moldability can be prevented.

Furthermore, by the method for producing the fiber-reinforced resin molded body 100 and the press molding apparatus 10 according to the implementation, both end portions of the plate-like molding matrix 110 supported by the supports 66a and 66b are lowered slowly, and are brought down to the shear edges 56a and 56b of the mold main bodies 50a and 50b of the lower mold 40. Therefore, both end portions of the plate-like molding matrix 110, which has a width larger (longer) than the width of the molding area, can be mounted on the molding surfaces 52a and 52b of the mold main bodies 50a and 50b of the lower mold 40 while being aligned to the positions of the shear edges 56a and 56b.

Furthermore, by performing mold compression while bringing the ends of the plate-like molding matrix 110, which has a width larger than the width of the molding area, down to the shear edges 56a and 56b, the material can be mold-compressed while being pushed to the central portion side. Therefore, a reduction in the filling rate of the material in a part of the fiber-reinforced resin molded body 100 and cracking of the molding matrix 110 can be prevented. Thereby, the moldability in producing the fiber-reinforced resin molded body 100 can be improved.

Although the preferred implementations of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, in the implementation described above, the pushing parts 28a and 28b push the parts to be pushed 64a and 64b of the support mechanism 60 in accordance with the fall of the upper mold 20, and thereby the amount of protrusion of the supports 66a and 66b from the molding surfaces 52a and 52b of the mold main bodies 50a and 50b is reduced; but the present invention is not limited to the example. For example, the apparatus may be configured as an apparatus in which a control mechanism is used to lower the supports 66a and 66b in accordance with the fall of the upper mold 20. Also by the configuration, the effect of the present invention can be obtained.

The invention claimed is:

1. A method for producing a fiber-reinforced resin molded body in which the fiber-reinforced resin molded body having a three-dimensional shape is produced by press-molding a heated and softened flat molding matrix using a mold, the method sequentially comprising:
(A) a step that sets the flat molding matrix on a lower mold including a pad in a central portion and mold main bodies on both sides of the pad by mounting a central portion of the flat molding matrix on the pad and causing at least one of both end sides of the flat molding matrix to be supported by at least one support protruding upward from a molding surface of at least one of the mold main bodies;
(B) a step that brings an upper mold and the lower mold close together to cause the central portion of the flat molding matrix to be sandwiched by the pad and the upper mold;
(C) a step that brings the upper mold and the lower mold still closer together to reduce an amount of protrusion of the at least one support;
(D) a step that presses the flat molding matrix by using the lower mold and the upper mold to form the fiber-reinforced resin molded body, wherein
the pad and the at least one support are vertically movable relative to the mold main bodies,
the pad is loaded upwards by a spring,
the pad and the at least one support are vertically movable independent of each other,
the mold main bodies are provided on a substrate, and
the at least one support is fixed to an upper surface of the substrate; and
(E) a step that cools the flat molding matrix by using coolant passages provided on a back side of an upper surface of the pad,
wherein the upper surface of the pad faces the upper mold.

2. The method for producing the fiber-reinforced resin molded body according to claim 1, wherein
in the step (A), at least one end of the flat molding matrix in an area supported by the at least one support is located on an outside of at least one shear edge provided in the at least one of the mold main bodies, and
in the step (C), the amount of protrusion of the at least one support is reduced to bring the at least one end of the flat molding matrix down to an inside of the at least one shear edge.

3. The method for producing the fiber-reinforced resin molded body according to claim 1, wherein
the flat molding matrix is made of a fiber-reinforced resin in which reinforcing fibers oriented in one direction are impregnated with a matrix resin, and
in the step (A), the central portion of the lower mold in a transverse direction crossing the one direction mounts on the pad and the at least one support supports at least one of the both end sides of the flat molding matrix in the transverse direction crossing the one direction.

4. The method for producing the fiber-reinforced resin molded body according to claim 2, wherein
the flat molding matrix is made of a fiber-reinforced resin in which reinforcing fibers oriented in one direction are impregnated with a matrix resin, and
in the step (A), the central portion of the lower mold in a transverse direction crossing the one direction mounts on the pad and the at least one support supports at least one of the both end sides of the flat molding matrix in the transverse direction crossing the one direction.

5. The method for producing the fiber-reinforced resin molded body according to claim 1, wherein
in the step (D), the pressing is performed after the at least one support recedes to the molding surface of the at least one of the mold main bodies.

6. The method for producing the fiber-reinforced resin molded body according to claim 2, wherein
in the step (D), the pressing is performed after the at least one support recedes to the molding surface of the at least one of the mold main bodies.

7. The method for producing the fiber-reinforced resin molded body according to claim 1, wherein
in the step (A), the upper surface of the pad and an upper surface of the at least one support are located above molding surfaces of the mold main bodies,
the flat molding matrix is set on the pad and the at least one support while an area of the flat molding matrix between a portion mounted on the pad and a portion caused to be supported by the at least one support is supported by at least one conveyance tool, and then
the at least one conveyance tool is pulled out from a space between the pad and the at least one support.

8. The method for producing the fiber-reinforced resin molded body according to claim 2, wherein
in the step (A), the upper surface of the pad and an upper surface of the at least one support are located above molding surfaces of the mold main bodies,
the flat molding matrix is set on the pad and the at least one support while an area of the flat molding matrix between a portion mounted on the pad and a portion caused to be supported by the at least one support is supported by at least one conveyance tool, and then
the at least one conveyance tool is pulled out from a space between the pad and the at least one support.

* * * * *

UNITED STATES PATENT AND TRADEMARK OFFICE
CERTIFICATE OF CORRECTION

Page 1 of 1

PATENT NO. : 10,926,448 B2
APPLICATION NO. : 15/164517
DATED : February 23, 2021
INVENTOR(S) : Ono et al.

It is certified that error appears in the above-identified patent and that said Letters Patent is hereby corrected as shown below:

On the Title Page

Item (73), on Column 1, Line 10, TOA INDUSTRIES CO., LTD, Ota, Japan and SUBARU CORPORATION, Tokyo, Japan should be listed as Assignee Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*